Figure 14:
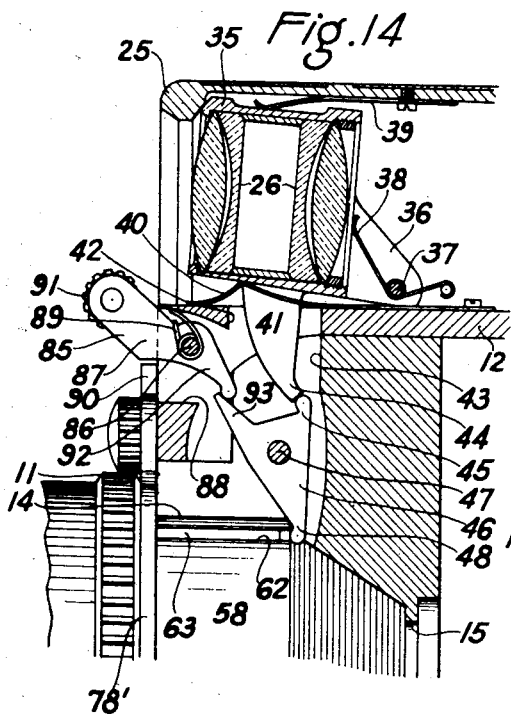

Feb. 8, 1944.  O. WITTEL  2,341,495
FOCUSING FINDER SYSTEM FOR CAMERAS
Filed July 19, 1941  3 Sheets-Sheet 1
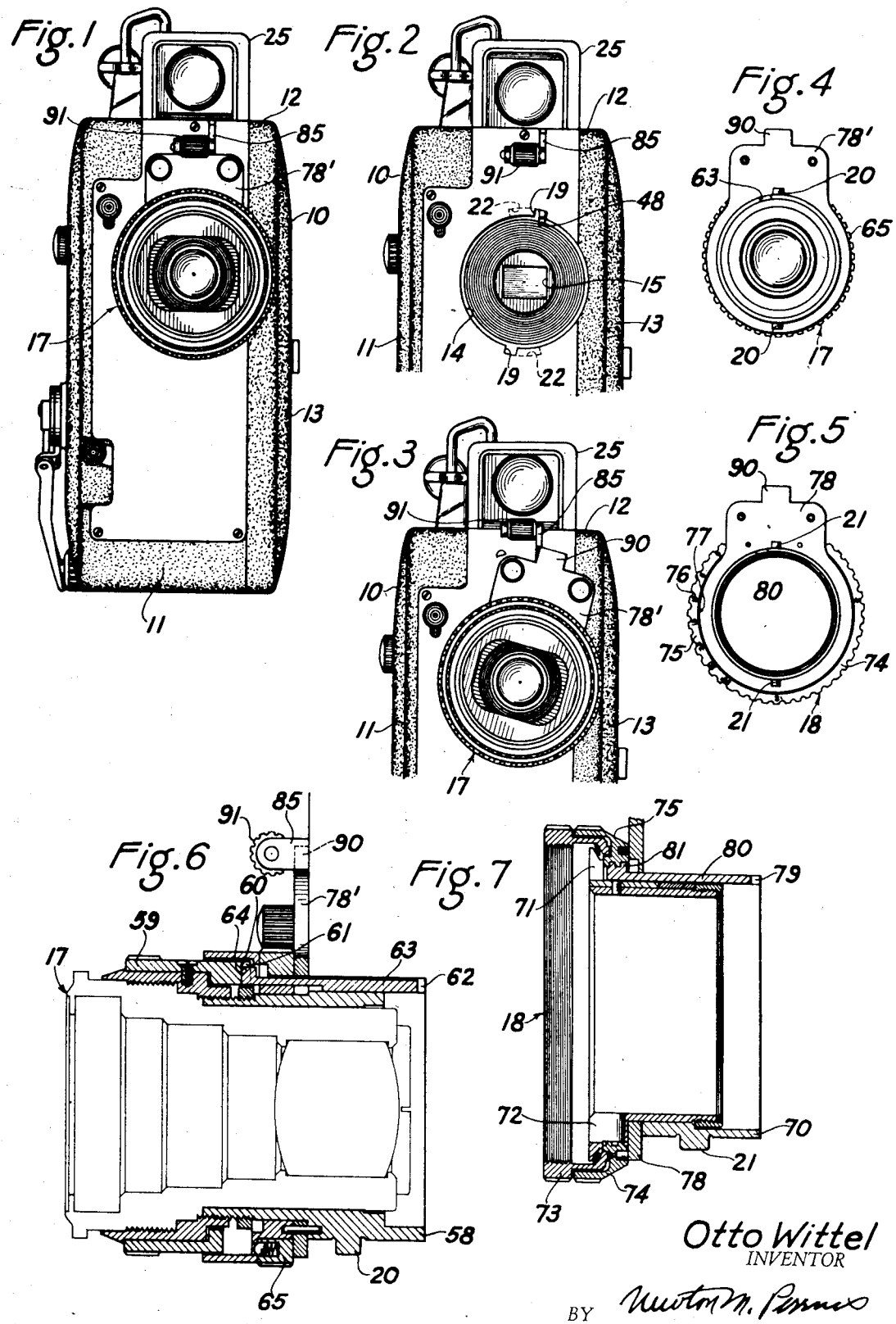
Otto Wittel
INVENTOR Feb. 8, 1944.  O. WITTEL  2,341,495
FOCUSING FINDER SYSTEM FOR CAMERAS
Filed July 19, 1941  3 Sheets-Sheet 2
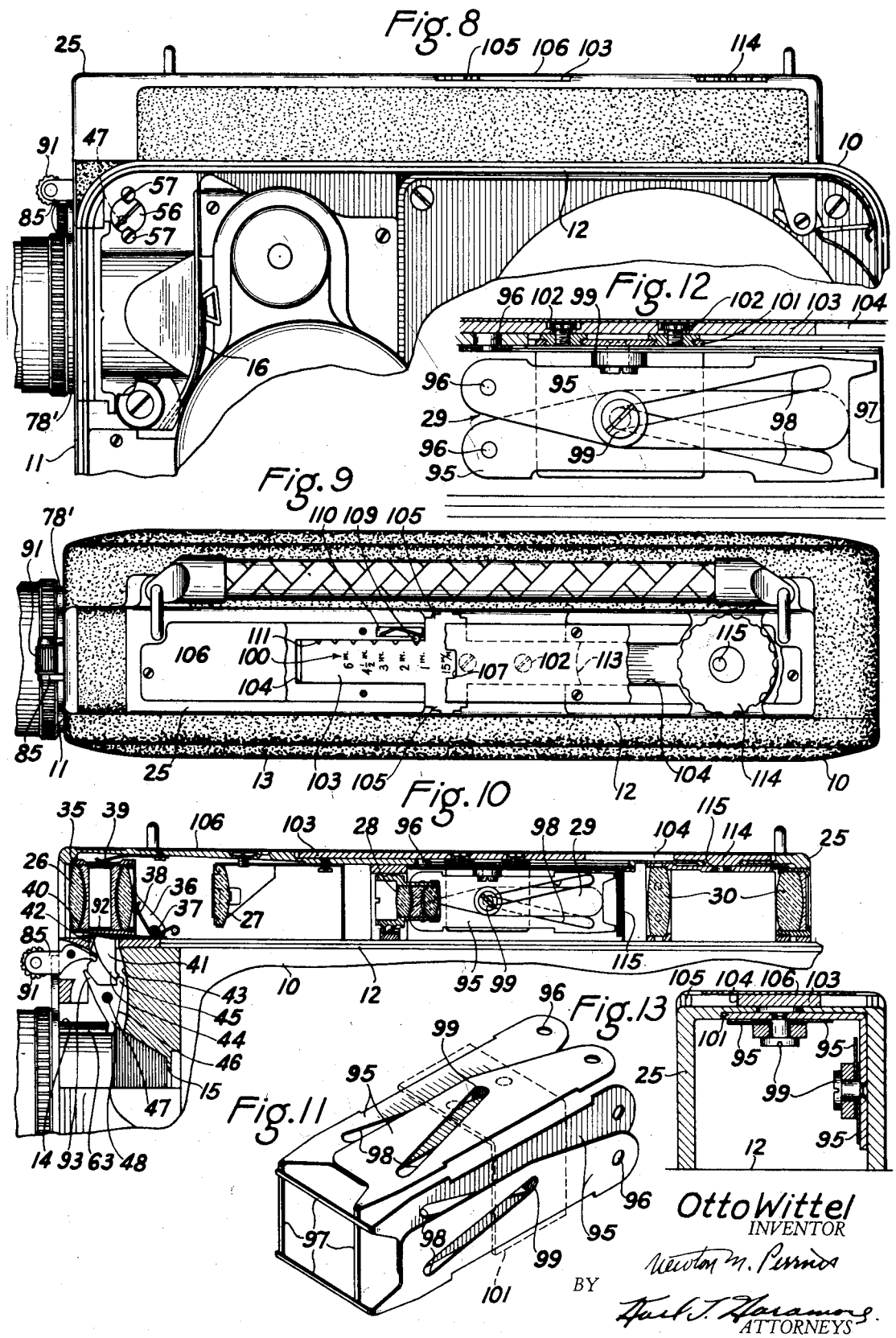
Otto Wittel
INVENTOR
BY
ATTORNEYS Feb. 8, 1944.   O. WITTEL   2,341,495
FOCUSING FINDER SYSTEM FOR CAMERAS
Filed July 19, 1941   3 Sheets-Sheet 3

Otto Wittel
INVENTOR

BY
ATTORNEYS

Patented Feb. 8, 1944

2,341,495

UNITED STATES PATENT OFFICE 2,341,495

FOCUSING FINDER SYSTEM FOR CAMERAS

Otto Wittel, Rochester, N. Y., assignor to Eastman Kodak Company, Rochester, N. Y., a corporation of New Jersey Application July 19, 1941, Serial No. 403,202

10 Claims. (Cl. 95—45)

This invention relates to focusing finder systems for photographic cameras, and particularly to the coupling between the finder lens and the focusing member of the camera objective by means of which the finder is automatically focused and corrected for parallax by an adjustment of said focusing member.

One object of the present invention is the provision of a finder system for a camera in which the finder lens is adapted to be simultaneously moved along its optical axis for focusing purposes and laterally relative to the optical axis of the camera objective for the correction of parallax.

And another object is to provide a coupling between said finder lens and the focusing member for the camera objective whereby said finder lens is moved by an adjustment of said focusing member to focus the finder and correct the same for parallax.

And still another object is to provide a coupling which is adapted to be broken so as to permit the ready attachment and removal of different focusing members onto, and from, the camera.

And yet another object is the provision of a releasable latch on the camera which normally prevents a focusing member from being attached to, or removed from, the camera, said latch being connected to said coupling in such a way that movement of the same to a released position acts to break said coupling.

A further object is the provision of a coupling of the type set forth which includes a pivoted lever adapted to normally extend into an operating position to engage a part associated with the focusing member when the same is mounted on a camera, said latch when in a locking position permitting said lever to assume its operative position but adapted to engage and move said lever from its operative position when moved to a releasing position to permit the focusing member to be attached to, or removed from, the camera.

And another object is to provide a finder lens adjusting coupling of the type set forth which is extremely simple and rugged in construction, yet foolproof in operation.

And yet another object is to provide a focusing finder of the type set forth having a novel variable field mechanism by means of which a field corresponding to lenses of different focal length can be readily obtained.

And another object is to provide a variable field mechanism which is so designed that a finder housing only slightly larger than the maximum field for which the device is capable is required to house the mechanism.

And another object is to provide a variable field mechanism of the type set forth which is simple in construction, efficient in operation, and readily adjusted in accordance with lenses of different focal length by the adjustment of a single member.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a front elevation of a motion picture camera equipped with a focusing finder constructed in accordance with one embodiment of the present invention, and showing the focusing member for the lens mounted on the camera, Fig. 2 is a partial front elevation correpsonding to Fig. 1, and showing the focusing member removed from the camera, Fig. 3 is a view corresponding to Figs. 1 and 2, and showing the latch preventing attachment of the focusing member to the camera, Fig. 4 is a rear elevation of an objective mount including a focusing member adapted to be attached to the camera, Fig. 5 is a rear elevation of an adapter ring including a focusing member adapted to be attached to the camera, Fig. 6 is an enlarged view, partially in section and partially in elevation, showing an objective mount attached to, and locked on, the front of the camera, Fig. 7 is an enlarged sectional view of the adapter, showing the focusing member carried thereby, Fig. 8 is an enlarged partial side view of the camera with the cover removed therefrom, Fig. 9 is a top plan view of the camera, Fig. 10 is a partial side view of the camera, partially in section, and with the side wall of the finder housing removed, Fig. 11 is an enlarged perspective view of the variable field mechanism constituting a part of the focusing finder system, Fig. 12 is an enlarged section of that portion of Fig. 10 which comprises the variable field mechanism.

Fig. 13 is a sectional view through the finder showing the method of mounting the variable field mechanism in the finder housing.

Figure 15:
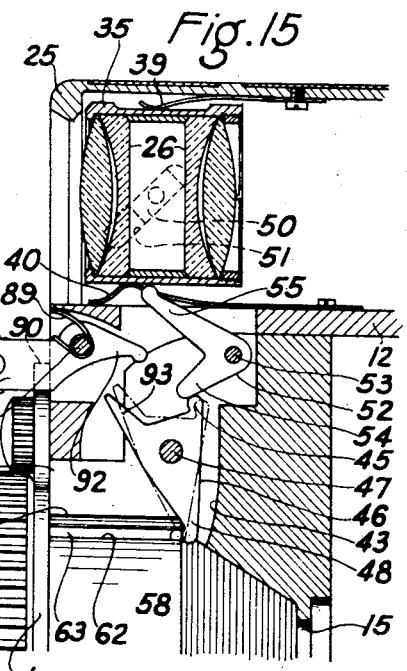
Figure 16:
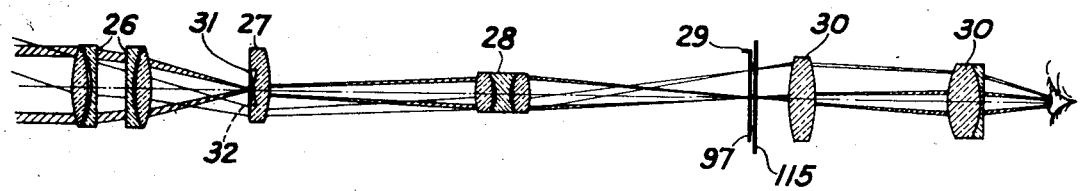
Figure 17:
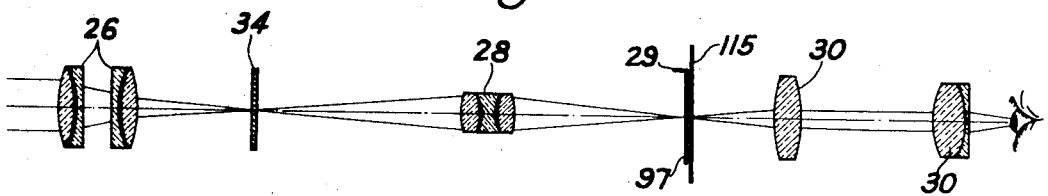
Figure 18:
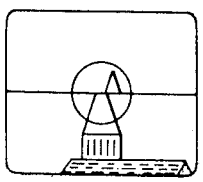
Figure 19:
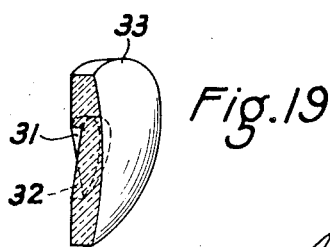

Fig. 14 is an enlarged sectional view of the upper front part of the camera, showing one embodiment of the finder lens mounting and a coupling for adjusting the same, Fig. 15 is a view similar to Fig. 14, but showing a second embodiment of the finder lens mounting and a coupling for adjusting the same, Fig. 16 is a diagrammatic view of one form of optical system which might constitute the camera finder system, Fig. 17 is a diagrammatic view of another optical system which might constitute the finder system, Fig. 18 shows the form of image formed by the finder system shown in Fig. 16, and Fig. 19 is an enlarged perspective view of the optical dispersing means forming a part of the finder system shown in Fig. 16.

Like reference characters refer to corresponding parts throughout the drawings.

Briefly, the present invention relates to a focusing finder for a camera, the finder lens of which is mounted so as to move simultaneously axially of the finder system for focusing and laterally relative to the camera objective for parallax correction. A coupling is provided in the camera whereby the finder lens is adapted to be moved by the adjustment of a focusing member capable of being detachably mounted on the front of the camera, and the coupling is such that it permits the focusing member to be readily interchanged on the camera for another focusing member of the same, or different, type; the coupling being automatically connected to the focusing member when the latter is attached to the camera. A latch is provided on the camera which must be moved from a normal operative position before the focusing member can be attached to, or removed from, the camera. This latch is associated with a member of said coupling so that the coupling is removed from operative relation to the focusing member of a mount before the member can be attached to, or removed from, the camera. The finder system includes a variable field mechanism by ready adjustment of which the field suitable for camera objectives of different focal lengths can be obtained.

Referring now to the drawings, the reference numeral 10 indicates a motion picture camera of any well-known construction having a front wall 11, a top wall 12, and a removable side wall or cover 13. The front wall 11 is provided with an objective socket 14 in alignment with the exposure aperture 15 of the film gate 16, and into which an interchangeable objective mount 17, or objective adapter 18, of the type best shown in Figs. 4 and 5 respectively and described hereinafter, is adapted to be detachably mounted. As clearly shown in Fig. 2, the front wall of the camera adjacent to the periphery of the objective socket is provided with two diametrically disposed notches 19 adapted to receive two diametrically disposed pins 20 extending laterally from the rear end of the objective mount, or pins 21 extending laterally from the rear end of the adapter 18. The notches are disposed at an angle to the vertical, as shown in Fig. 2, so that the objective mount, or adapter, must be twisted to the position shown in Fig. 3 in order to attach the mount, or adapter, to the camera, or remove the same therefrom. After the pins on the rear end of the mount are inserted into the notches 19 the mount is rotated to an upright position, as shown in Fig. 1, whereupon the pins 19 engage an arcuate recess 22 behind a front wall of the camera to lock the mount, or adapter, on the camera. This bayonet type lock arrangement for detachably connecting the mount, or adapter, to the camera does not form a part of the present invention per se but is completely disclosed in my U. S. Patent 2,110,477, issued March 8, 1938, to which reference can be had for a more detailed description of the same.

On the top wall 12 of the camera is mounted a finder housing 25 which may serve to house a focusing finder system. Referring to Figs. 10, 16, 17, the finder system may comprise a finder lens 26, an optical dispersing arrangement 27, an erector lens 28, a variable field mechanism 29, and an adjustable eyepiece 30. The two finder systems differ only in that the optical dispersing means of the finder system shown in Figs. 10 and 16 comprises a pair of inverted optical wedges 31 and 32 which form a split field of the type shown in Fig. 18. When the finder lens is not focused on the optical dispersing arrangement the two parts of the split field will be out of alignment as shown. When the finder lens is moved axially of the optical dispersing means to be in focus thereon then the two parts of the split field will be in alignment to indicate that the finder is in focus. The optical wedges 31 and 32 may be formed by grinding flats in a field lens 33 as shown in Fig. 19. The optical dispersing means 27 may constitute a ground glass 34 instead of the optical wedges as set forth, as shown in Fig. 17, in which case the finder lens 26 is in focus when the image appears sharp on the ground glass as is well known. The optics of the finder system, shown in Figs. 10, 16 and 19, is not my invention, but is the invention of Joseph Mihalyi and is described and claimed in patent application Serial No. 478,742, filed March 11, 1943, by him.

In each of the finder systems disclosed the finder lens 26 must be moved along the optical axis of the finder system relative to the optical dispersing means for focusing purposes. In addition, it is desirable that the finder lens be moved laterally relative to the optical axis of the camera objective during focusing to correct for parallax so that the field viewed in the finder will correspond to that formed by the camera objective in the exposure aperture of the camera. To this end, the lens elements making up the finder lens are confined in a mount 35 which is mounted in the finder housing in such a manner that it simultaneously moves axially of the optical axis of the finder system for focusing purposes and laterally relative to the optical axis of the camera objective for parallax correction, whereby parallax is automatically corrected for during the focusing of the finder.

In the preferred embodiment shown in Figs. 10 and 14 the finder lens is pivotally mounted in the forward end of the finder housing to move through an arc. The pivot point of the finder lens is so located relative to the finder lens that the small arc of movement of the lens required is substantially a straight line at an angle to the optical axis of the finder system whereby the lens is simultaneously moved along the optical axis of the finder system for focusing and laterally of the optical axis for correction of parallax. The angle of movement of the finder lens will depend upon the lateral spacing of the finder lens and camera objective, because it is this spacing which must be accounted for in the correction of parallax as those skilled in the art are well aware. The finder lens mount includes two rearwardly extending arms 36 on either side of the mount which are pivoted at 37 to the side walls of the finder housing. The finder lens is normally pivoted in a counter-clockwise direction by the action of spring 38, acting on the rear end of the lens mount, and the spring 39 fixed to the top wall of the finder housing pressing downwardly upon the top of the lens mount. One or more light cushioning springs 40 located on the bottom wall of the finder housing beneath the lens mount engage the lower part of the lens mount to prevent the same from being forced against the bottom of the finder housing with impact by the action of springs 38 and 39. It is pointed out, however, that the spring, or springs 40, is not strong enough to overcome the tendency of springs 38 and 39 to move the lens mount in a counter-clockwise direction.

An arm 41 fixed to the finder lens mount extends from the lower side thereof through an opening 42 in the top wall 12 of camera 10 and into a recess 43 formed in the upper front portion of the camera directly behind the front wall of the camera, see Fig. 14. The end 44 of this arm engages the nose 45 on the lever, or bellcrank, 46 pivoted at 47 in the recess 43 of the camera. This lever 46 includes an arm 48 the end of which normally extends to a point behind the lens socket and in alignment with a notch 19 in the front wall of the camera adjacent said socket where it is adapted to engage a cam or cam follower carried by the camera objective mount or adapter when the same is attached to the camera as will be fully set forth hereinafter.

In the event the finder housing is so small, or so arranged, that there is not sufficient room available to allow the finder lens to be pivoted on a radius great enough so that the limited arc of movement required will be substantially a straight line, the finder lens may be mounted in the finder housing in such a way as to have a straight line movement at an angle to the optical axis of the finder system. Such a modification of a finder lens mounting is shown in Fig. 15 wherein the finder lens mount is shown as having a key and slot connection with the side walls of the finder housing to give the necessary simultaneous axial and lateral movement of the lens for focusing purposes and automatic parallax correction. Referring to Fig. 15, the finder lens mount includes a pair of diametrically disposed keys 50 adapted to engage in slots 51 of the side wall of the housing and which slots are inclined to the optical axis of the finder system as shown. The key and slot connections are shown as being of considerable length in order to prevent the finder lens from tilting during movement, and not to indicate that the lens has this amount of movement. Actually the finder lens moves only about 1/16 of an inch axially and 3/32 of an inch laterally to cover the complete range of focus and parallax correction. The finder lens is normally forced downwardly by a spring 39, as in the embodiment shown in Fig. 14, and is cushioned by a spring, or springs 40 as previously set forth.

The arm 41 provided in the embodiment shown in Fig. 14 is replaced by a crank 52 pivoted in the camera at 53, one arm 54 of said crank engaging the nose 45 on the lever 46, the other arm 55 of said crank engaging the lower side of the finder lens mount. When the lever 46 is moved counter-clockwise the crank 52 moves clockwise and the arm 55 thereof moves the finder lens upwardly in the slots 51 against the action of the spring 39. The crank 52 is necessary in the coupling shown in Fig. 15, in place of arm 41 of the embodiment shown in Fig. 14, in order that movement of the lever 46 will cause the proper movement of the finder lens and be operatively connected thereto in all positions of the finder lens along its path of movement. In each instance, when the finder lens is moved to its uppermost position in the finder housing it is properly positioned for a focus at infinity. As the finder is focused on objects closer than infinity the finder lens automatically moves laterally towards the optical axis of the camera objective until, when the finder is focused on a subject at approximately two feet, the finder lens is at its lowermost position in the finder housing. The inclination of the slot 51 in the embodiment shown in Fig. 13, or the location of the pivot point in the finder lens in the embodiment shown in Fig. 12, are such that the lateral movement of the finder lens accompanying an axial focusing movement thereof insures the finder being automatically corrected for parallax at any point of focus.

The finder lens is adapted to be moved by adjustment of a focusing member adapted to be detachably mounted in the objective socket on the forward wall of the camera. The focusing member may form a part of the focusing camera objective mount capable of being detachably connected to the camera, or may be carried by an adapter member capable of being detachably connected to the camera to receive interchangeable objective mounts of different focal lengths, all as will be hereinafter fully described.

When sold, the camera is equipped with a focusing objective mount of the type best shown in Figs. 4 and 6 which is adapted to be detachably connected in the objective socket as previously set forth. Only the adjustable parts of the objective mount which are essential to an understanding of the present invention are shown in detail in the drawings, the remaining parts of the mounts, which are well known, being omitted and shown by a general outline. Referring to Figs. 4 and 6, the objective mount includes a rearwardly extending tubular portion 58 which extends well into the recess in the camera when the mount is attached thereto by the bayonet lock arrangement previously set forth. The mount also includes a rotatable focusing ring 59 which is threaded to the lens barrel so as to cause a focusing movement of the lens when rotated.

The rear face of the focusing ring terminates in an axial cam 60 the pitch of which is indicated at 61. Slidably mounted in a longitudinal slot 62 in the rear tubular portion 58 of the mount is a cam follower 63, one end 64 of which is adapted to engage the face of the axial cam 60 and be moved axially of the mount thereby. The axial slot 62 for the cam follower extends completely to the end of the tubular portion 58 so that the free end of the cam follower is accessible from the end of the mount. Looking at Figs. 2 and 4 it will be noticed that the axial slot 62 and the cam follower 63 are situated to one side of one of the bayonet pins 20 on the mount so that when the mount is rotated to its locked position the end of the cam follower will be in alignment with the arm 48 and the lever 46 in the camera which assumes this position, see Fig. 2. Thus, when the objective mount is placed on the camera the free end of the cam follower is abutted by the arm 48 of the lever 46 and is adapted to be pivoted counterclockwise when the cam follower is moved rearwardly by adjustment of the focusing ring on the mount.

The cam follower, which is in effect an actuating member for the finder lens adjusting means 46, is confined against accidental removal from the slot by the diaphragm adjusting ring 65 of the mount, or some equivalent part of the mount. It is moved into, and held in, engagement with the cam by the action of the springs 38 and 39 normally forcing the finder lens to its lowermost position, said springs tending to move the lever 46 clockwise. Thus the cam follower will act to move the finder lens against the action of the spring when focusing from a close distance toward infinity, and the springs will tend to move the finder lens when focusing is done in the other direction, the cam follower serving merely to limit movement of the lens under the influence of the springs. The cam on the focusing ring of the objective mount is constructed in accordance with the focal length of the objective so that whenever the finder indicates that a given subject is in focus the camera objective will be focused on said subject.

A person purchasing a camera having a focusing finder of the type set forth might possess one or more interchangeable objectives of different focal length, e. g., telephoto, which would not be equipped with a cam for operating the finder lens adjusting coupling. So that the present camera may be adapted to use all interchangeable objectives having no finder lens operating cam of their own the following structure is provided.

Referring to Figs. 5 and 7, an objective adapter 18 is provided, which adapter may be detachably mounted in the objective socket 14 in the camera in place of, and in the same manner as, the objective mount supplied with the camera. This adapter may comprise a rear tubular portion 70 including bayonet pins 21 adapted to engage the notches 19 in the camera front to lock the adapter to the camera in the same manner as the objective mount is attached thereto. The forward end of the tubular portion 70 terminates in a flange 71 against which the rear end of an interchangeable lens is adapted to abut, said flange including a locating recess 72 for receiving a locating pin provided on said mount to properly locate the mount in the proper position on the camera. After the objective mount is inserted into the adapter it is attached thereto by the threaded attaching ring 73 rotatably mounted on the forward end of the adapter which threadedly engages threads provided on the rear end of the mount, as is well known.

Rotatably mounted on the adapter is a focusing member 74 the rear bevel face 75 of which includes a focusing scale 76 cooperating with an index 77 on a stationary plate 78 forming a part of the adapter, see Fig. 5. The rear tubular portion 70 of the adapter is provided with a longitudinal slot 79 in which is slidably mounted a cam follower, or actuating member, 80. The slot 79 and cam follower 80 are located in the same relative position on the adapter as the corresponding parts 62 and 63 are on the objective mount previously described, and serve the same purpose when the adapter is attached to the camera. Instead of the focusing member having an axial cam for moving the cam follower as on the lens mount construction described, there is a threaded connection 81 between the focusing member 74 and the cam follower which moves the cam follower axially upon rotation of the focusing member. The pitch of the threaded engagement 81 is equal to the pitch of the cam 60 provided on the lens mount and the focusing scale is the same as that on said lens mount. In order to focus the lens mount carried by the adapter 18 by use of the focusing finder, the focusing member 74 of the adapter is rotated, while viewing through the finder, until the image appears in focus. Then the reading of the focusing scale 76 on the focusing member is observed, and the focusing ring of the lens mount is turned to give a corresponding reading on its focusing scale. In other words, the focusing scale 76 on the focusing member is used just to determine a given range and then the focusing ring of the objective mount proper is adjusted to give the focusing range so determined.

Referring to Figs. 14 and 15 it will be noted that in most positions of focus less than infinity the arm 48 on the lever 46 of the camera extends into the axial slot 62 in the end of the mount, or the axial slot 79 in the rear end of the adapter ring 80, depending upon which of the two is attached to the camera. It will be readily appreciated that since this mount, or adapter, must be rotated before it can be removed from the camera, the presence of the arm of this lever in said slot would prevent the removal of the mount. Furthermore, any attempt to rotate the mount or adapter to a position where it could be removed from, or could be attached to, the camera, would tend to bend the arm 48 of the lever 46 if the same were extending into the slot. Therefore, it is essential that means be provided whereby the lever 46 must be pivoted counter-clockwise to a position where the arm 48 thereof will be removed from the slot before any rotative movement of the mount, or adapter, necessary to its detachment from the camera can be made.

To this end, I provide a releasable latch mechanism which must positively be actuated before the mount, or adapter, can be rotated relative to the camera, and which latch mechanism is connected to said lever 46 so as to move the same counter-clockwise to a position where the arm 48 thereof is free of the rear end of the mount, or adapter, when moved to a releasing position. The latch mechanism is also so arranged that it will not permit the return of the lever 46 to its normal position until the mount, or adapter, is in a full attached, or a full released position relative to the camera.

To this end, a latch member 85 is pivoted at 86 in the recess 43 in a camera so that the arm 87 thereof extends through a slot 88 in the front wall of the camera. This latch member is normally pivoted counter-clockwise by a spring 89 to an operative position wherein it extends into the path of movement of a latch element 90 projecting from a stationary plate 78 fixed to the adapter 18, or from a corresponding plate 78' fixed to the objective mount. It will be apparent from an inspection of Fig. 3 that when the latch member 85 is in its normal operative position it extends into the path of the latch element 90 and prevents the mount, or adapter, from being rotated to a locked position on the mount. It will be obvious from an inspection of Figs. 3 and 14 that when the latch element is manually raised by gripping the fingerpiece 91 thereon the latch element 90 is free to pass thereunder so that the mount or adapter can be rotated relative to the camera. It will be noticed that the latch element 90 is of such a width that the latch member, once the latch element is moved under it, cannot return to its operative position until the mount, or adapter, is rotated to either its full attached, or its full released, position. It will be evident from an inspection of Figs. 1, 6, and 15 that when the mount, or adapter, is rotated to its attached position the latch member drops down behind the right hand edge of the latch element, looking at Fig. 3, so as to positively prevent removal of the mount, or adapter, without first manually raising the latch member.

The latch member 85 includes an arm 92 which is adapted to engage a finger 93 on the lever 46, when rotated to an inoperative position, and pivot the lever 46 in a counter-clockwise direction to a point where the arm 48 thereof is removed from the axial slot 62 in the mount, or the axial slot 79 in the adapter, depending upon which member is attached, or is to be attached, to the camera, see Fig. 14. Therefore, before the lens mount, or adapter, can be rotated relative to the camera the latch element must be manually raised and this insures the lever 46 being removed from its operative position so that there is no danger of the same being injured by attachment or removal of the mount or adapter. When the latch member 85 is in its normal operative position, the lever 46 is freed by the latch member and is allowed to return to its cam follower engaging, or operative, position under the action of the springs normally acting on the finder lens to move the same downwardly in the finder housing, see Fig. 15. In Fig. 15 the position the lever 46 assumes when operative is shown by dotted line, and the position it assumes when the latch member 85 is moved to its inoperative position is shown by full line, the position shown being the infinity position.

It is sometimes found necessary to finally adjust the coupling between the finder lens and the focusing member on the camera after the parts are assembled in order to render the mechanism accurate. To this end the pivot point 47 of the lever 46 is eccentrically mounted on a screw 56 which can be adjusted by a screw driver, see Fig. 8. The screw 56 is adapted to be clamped in any desired position of adjustment by tightening down the clamping screws 57. It will be readily understood that rotation of screw 56 shifts the pivot point of lever 46 and thereby changes the mechanical advantage of the lever. This adjustment is purely a factory adjustment and is provided only to account for minor inaccuracies in the coupling.

As is well known to those skilled in the art the size of the field covered by different lenses varies in accordance with the focal length of the lens. For instance, a 6-inch telephoto lens will cover a very limited field, while a 15-mm. lens will cover a much larger field. So that the finder system will indicate the correct size of field covered by the lenses of different focal lengths, according to the present invention a variable field mechanism of the type shown in Figs. 10-13 is provided in the finder housing.

This variable field arrangement comprises a pair of slotted links 95 pivoted at one end at 96 in overlapping relation on two adjoining walls of the rectangular finder housing. The free end of each of these links is cut down to provide a narrow strip 97 turned at right angles to the links proper to extend transversely of the finder housing and define the size of the field of view. The slot 98 in each link is formed at an angle to the slot of its companion link so that when a pin 99 extending through the slot 98 of each link is moved longitudinally of the finder housing the links of each pair will be moved towards or away from one another depending upon the direction of movement of said pin in accordance with a scale 100 on the top of the finder housing indicating proper setting for different focal length lenses. So that the four framing strips 97 can be adjusted simultaneously through the actuation of a single member, the two pins 99 controlling the movement of the links are mounted on an L-shaped member 101 slidably mounted in the finder housing. This L-shaped member 101 is connected by screws 102 to the under side of a slide 103 slidably mounted in a groove 104 in the outside face of the top of the finder housing, said slide having finger grips 105 extending therefrom to facilitate manual adjustment of the slide. Slide 103 is covered by a plate 106 having an aperture 107 therein through which the individual readings of the scale 100 of lens focal lengths can be viewed individually as the slide is moved. A spring-pressed ball 109 mounted in a recess 110 in the side of the groove 104 is adapted to be snapped into and out of notches 111 in the edge of the slide to momentarily arrest the slide in its different positions of adjustment when moved along in the groove. The top of the finder housing is cut away to provide a recess 112 in which the finger pieces 105 are adapted to slide and be accessible for manual manipulation, see Figs. 9 and 13. Movement of the slide 103 is limited in opposite directions by the engagement of the finger pieces 105 with opposite ends of the recess 112. The eyepiece 30 of the finder is adapted to be adjusted longitudinally of the finder system by adjustment of the knob 114 to which the mount for the eyepiece is eccentrically mounted as at 115. This adjustment is provided merely for the purpose of accommodating the finder to the individual's eyesight.

The maximum field of the finder system is constantly defined by a fixed frame 115 attached to the finder housing by a screw adjacent the narrow strips 97 constituting the variable field. When the variable field arrangement is adjusted for a 15-mm. lens the field will be of its maximum size and the narrow strips 97 will be in alignment with the sides of the fixed frame 115. When the slide 103 is moved rearwardly of the finder housing to give the proper field for a 3-inch lens, the pins 99 will simultaneously be moved rearwardly and by virtue of their engagement with the slots 98 in the links 95 will cause the free end of the links to move toward the center of the field in a way to maintain a rectangular field. The fact that the field defining strips 97 are narrow permits the operator to see the maximum field of the finder at all times even though the actual field defined may be much smaller than said maximum field. This is a decided advantage because it allows the operator to follow the movement of the moving object toward the actual field of the lens so that he can be ready to take pictures the instant said object moves into the actual field. The variable field arrangement disclosed has the further advantage that the particular arrangement of parts requires a finder housing which is only slightly larger than the maximum field to be defined, so that the finder housing can be of a size which fits onto the thinnest of cameras and does not distract from, but adds to, the appearance of the camera.

From the above description of my invention it will be readily appreciated that I have designed a focusing finder the finder lens of which is mounted in a novel manner to permit focusing and automatic parallax correction during focusing. The particular finder lens adjusting coupling which is adapted for use with different focusing members capable of being interchanged on the camera is simple and cheap in construction, as well as efficient in operation. The novel latch for locking the focusing members on or off of the camera body, through its connection with the coupling means, insures against the finder lens adjusting coupling being injured by removal, or attachment, of a focusing member onto the camera. The novel variable field mechanism provided in the finder adapts the finder for use with interchangeable lenses of different focal lengths, and is so constructed that the finder housing need be only slightly larger than the maximum field of the finder system to accommodate the same. The variable field mechanism is rugged in construction and is capable of being adjusted by the operation of a single member conveniently situated on the finder for ready manual operation, and is provided with a scale which clearly indicates the several adjustments of field of which it is capable.

While I have shown and described certain specific embodiments of my invention, I am fully aware that many modifications thereof are possible. My invention, therefore, is not to be restricted except insofar as is necessitated by the scope of the appended claims.

Having thus described my invention, what I claim is new and desire to secure by Letters Patent of the United States is:

1. In a photographic camera the combination with a camera objective, a finder housing on said camera and spaced laterally of said objective, a focusing finder system in said housing including a finder lens pivoted in said housing at a point spaced laterally of the optical axis of said finder system to move along a substantially straight line path at an angle to the optical axis of said finder to simultaneously focus the finder and correct the same for parallax, resilient means normally acting to pivot the finder lens in one direction, a focusing member movably mounted on the outside of said camera and including a focusing scale, of a coupling between said focusing member and said finder lens for pivoting said lens in the opposite direction upon adjustment of said member, said coupling including an actuating member movable axially of the optical axis of said camera objective in response to adjustment of said focusing member, and a motion transmitting linkage in said camera engaging said actuating member and connected to said finder lens to pivot the latter in said opposite direction in accordance with movement of said actuating member.

2. In a photographic camera the combination with a camera body having an objective socket, a focusing finder on said camera spaced laterally of said socket and including a finder lens movable axially for focusing and laterally for parallax correction, a mount for a camera objective removably mounted in said socket, a focusing member on said mount including a focusing scale, of a coupling between said focusing member and said finder lens for simultaneously moving said lens axially and laterally upon adjustment of said member, and including a lever movably mounted in said camera to engage a part on said mount, a latch on said camera normally moved to an operative position in which it prevents a mount from being removed from or attached to said camera, and manually movable to an inoperative position, and means for moving said lever of said coupling from its operative position when said latch is moved to its inoperative position and for returning said lever to its operative position when said latch returns to its operative position.

3. In a photographic camera the combination with a camera body having an objective socket, a focusing finder system on said camera including a finder lens mounted to move over a path which causes a simultaneous movement of the same axially for focusing purposes and laterally relative to the optical axis of the camera objective for parallax correction, a mount for a camera objective adapted to be detachably mounted in said socket, a focusing member on said mount including a focusing scale, of a coupling between said focusing member and said finder lens for moving said finder lens in accordance with an adjustment of said member, said coupling including a movable lever in said camera normally moved to an operative position wherein it is adapted to engage a part movably associated with said member when the mount is placed on the camera, and a latch means on said camera for positively preventing a mount from being removed from or attached to said camera until said lever is moved from its operative position.

4. In a photographic camera the combination with a camera body having an objective socket, a focusing finder system on said camera including a finder lens mounted to move over a path which causes a simultaneous movement of the same axially for focusing purposes and laterally relative to the optical axis of the camera objective for parallex correction, a mount for a camera objective adapted to be detachably mounted in said socket, a focusing member on said mount including a focusing scale, of a coupling between said focusing member and said finder lens for moving said finder lens in accordance with an adjustment of said member, said coupling including a movable lever in said camera normally moved to an operative position wherein it is adapted to engage a part movably associated with said member when the mount is placed on the camera, and latch means on said camera normally moved to an operative position wherein it prevents the mount from being attached to, or removed from, the camera, and means for moving said lever from its operative position when said latch means is moved to its release position to permit a mount to be attached to, or removed from, the camera.

5. In a photographic camera the combination with a camera body having an objective socket, a focusing finder system on said camera including a finder lens mounted to move over a path which causes a simultaneous movement of the same axially for focusing purposes and laterally relative to the optical axis of the camera objective for parallax correction, a mount for a camera objective adapted to be detachably secured in said socket, a focusing member on said mount including a focusing scale, a latch element on said mount, of a coupling between said focusing member and said finder lens for moving said finder, lens in accordance with an adjustment of said coupling including, a movable lever in said camera normally moved to an operative position wherein it is adapted to engage a part movably associated with said focusing member when the mount is attached to the camera, a latch member movably mounted on said camera and normally moved to an operative position wherein it is adapted to engage said latch element to prevent a mount from being attached to, or removed from, the camera until manually moved from said operative position, and cooperating parts on said latch member and said lever in the camera for causing said lever to be moved from its operative position when said latch member is moved from its operative position to permit a mount to be attached to or removed from the camera.

6. In a photographic camera the combination with a camera body having an objective socket, a focusing finder system on said camera including a finder lens mounted to move over a path which causes a simultaneous movement of the same axially for focusing purposes and laterally relative to the optical axis of the camera objective for parallax correction, a mount for a camera objective adapted to be detachably secured in said socket in a manner that a relative rotational movement between the mount and camera is necessary, a focusing member on said mount including a focusing scale, of a coupling between said focusing member and said finder lens for moving said finder lens in accordance with an adjustment of said coupling, and including a movable lever in said camera normally moved to an operative position wherein it is adapted to engage a part movably associated with said focusing member when the mount is attached to the camera, a latch element on said mount, a latch member movably mounted on said camera and normally moved to an operative position wherein it engages said latch element to prevent the mount from being attached to, or removed from, said camera until said member is moved from said operative position, said latch element being so formed that it is adapted to hold said latch member in an inoperative position during the time the mount is capable of rotation relative to the camera, and cooperating parts on said latch member and said lever for causing said lever to be moved from and, held out of, its operative position when, and during the time, said latch element is moved from its operative position to permit a mount to be attached to, or removed from, the camera.

7. In a photographic camera the combination with a camera body having an objective socket, a focusing finder system on said camera including a finder lens mounted to move over a path which causes a simultaneous movement of the same axially for focusing purposes and laterally relative to the optical axis of the camera objective for parallax correction, a mount for a camera objective adapted to be detachably mounted in said socket, a focusing member on said mount including a focusing scale, of a coupling between said focusing member and said finder lens for moving said lens in accordance with an adjustment of said member, and including a lever pivoted in said camera and normally moved to an operative position wherein it is adapted to engage a part movably associated with said member when the mount is placed on the camera, a latch member pivoted to said camera to move to and from an operative position wherein it is adapted to engage a part in said mount to prevent said mount from being attached to, or removed from, the camera, means normally moving said latch member to its operative position, means for manually moving said latch member from said operative position, and a projection on said latch member extending into said camera and adapted to engage and move said lever from its operative position when said latch member is moved from its operative position.

8. In a photographic camera the combination with a camera body having an objective socket, a focusing finder system on said camera spaced laterally of the axis of said socket and including a finder lens mounted to move over a path which causes a simultaneous movement of the same axially for focusing purposes and laterally relative to the optical axis of an objective mounted in said socket for parallax correction, a mount for a camera objective adapted to be detachably mounted in said socket, a rotatable focusing member on said mount including a focusing scale, of a coupling between said focusing member and said finder lens for moving the latter in accordance with an adjustment of said member, said coupling including an actuating member movable axially of said mount, a cam movable in response to an adjustment of said focusing member for moving said actuating member, a lever movably mounted in said camera and connected to said finder lens to move the same when moved itself, said lever including a portion adapted to operatively engage said actuating member when said mount is attached to said camera whereby said lever is adapted to be moved to adjust said finder lens by an axial movement of said actuating member.

9. In a photographic camera the combination with a camera body having an objective socket, a focusing finder system on said camera spaced laterally of the axis of said socket and including a finder lens mounted to move over a path which causes a simultaneous movement of the same axially for focusing purposes and laterally relative to the optical axis of an objective mounted in said socket for parallax correction, a mount for a camera objective adapted to be detachably mounted in said socket, a rotatable focusing member on said mount including a focusing scale, of a coupling between said focusing member and said finder lens for moving the latter in accordance with an adjustment of said member, said coupling including a cam surface on said mount movable in response to an adjustment of said focusing member, a cam follower slidably confined in an axial groove provided in the rear end of said mount and adapted to be moved along said groove by said cam in response to an adjustment of said focusing member, a pivoted lever in said camera connected to said finder lens to move the same and including a portion adapted to extend into said groove and into abutment with the end of said follower whereby the lever is adapted to be moved by adjustment thereof, means normally moving said lever to an operative position wherein said portion is adapted to engage said follower, and means for moving said lever from its operative position before the mount can be attached to, or removed from said camera.

10. In a photographic camera the combination with a camera body having an objective socket, a focusing finder system on said camera spaced laterally of the axis of said socket and including a finder lens mounted to move over a path which causes a simultaneous movement of the same axially for focusing purposes and laterally relative to the optical axis of an objective mounted in said socket for parallax correction, a variable field mechanism adjustable in accordance with different focal length objectives, a mount for a camera objective adapted to be detachably mounted in said socket, a rotatable focusing member on said mount including a focusing scale, of a coupling between said focusing member and said finder lens for moving the latter in accordance with an adjustment of said member, said coupling including a pivoted lever in said camera connected to said finder lens to move the same when pivoted itself, said lever normally pivoted in a direction to move an arm integral therewith toward said socket, a cam on said mount movable in response to an adjustment of said focusing member, a cam follower slidably mounted in an axial groove provided in the rear end of said mount and adapted to be engaged by the arm on said lever when the mount is attached to the camera and held in engagement with said cam by said lever.

OTTO WITTEL.